US011889600B2

(12) United States Patent
Sun

(10) Patent No.: US 11,889,600 B2
(45) Date of Patent: Jan. 30, 2024

(54) BACKLIGHT MODULE, DISPLAY PANEL AND DISPLAY CONTROL METHOD THEREOF, AND DISPLAY DEVICE

(71) Applicant: TCL CHINA STAR OPTOELECTRONICS TECHNOLOGY CO., LTD., Guangdong (CN)

(72) Inventor: Heyan Sun, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 115 days.

(21) Appl. No.: 17/623,473

(22) PCT Filed: Dec. 21, 2021

(86) PCT No.: PCT/CN2021/140117

§ 371 (c)(1),
(2) Date: Dec. 28, 2021

(87) PCT Pub. No.: WO2023/108723

PCT Pub. Date: Jun. 22, 2023

(65) Prior Publication Data

US 2023/0189416 A1 Jun. 15, 2023

(30) Foreign Application Priority Data

Dec. 15, 2021 (CN) ......................... 202111539825.7

(51) Int. Cl.
*H05B 47/105* (2020.01)

(52) U.S. Cl.
CPC .................................. *H05B 47/105* (2020.01)

(58) Field of Classification Search
CPC ..... H05B 47/105; G06Q 10/087; H04L 65/40
See application file for complete search history.

(56) References Cited

U.S. PATENT DOCUMENTS

2010/0134038 A1 6/2010 Shackle

FOREIGN PATENT DOCUMENTS

CN 103310755 A 9/2013
CN 103392147 A 11/2013
(Continued)

OTHER PUBLICATIONS

International Search Report in International application No. PCT/CN2021/140117,dated Aug. 29, 2022.
(Continued)

*Primary Examiner* — Stacy Khoo
(74) *Attorney, Agent, or Firm* — PV IP PC; Wei Te Chung; Zhigang Ma

(57) ABSTRACT

Embodiments of the present disclosure provide a backlight module, a display panel and a display control method thereof, and a display device. A generation circuit includes: a signal input terminal; a signal output terminal; a detection sub-circuit including at least one photoresistor and generating a first signal; and a generation sub-circuit connected to the detection sub-circuit and the signal output terminal and configured to process the first signal to obtain a low voltage level signal. Accuracy of the low voltage level signal obtained by a thin film transistor is high, and effect of turning off a gate is better.

11 Claims, 4 Drawing Sheets

1142

(56) References Cited

FOREIGN PATENT DOCUMENTS

| | | | | |
|---|---|---|---|---|
| CN | 105681451 | A | | 6/2016 |
| CN | 106057137 | A | | 10/2016 |
| CN | 107134269 | A | | 9/2017 |
| CN | 108877626 | A | | 11/2018 |
| CN | 109243377 | A | | 1/2019 |
| CN | 113096603 | A | | 7/2021 |
| CN | 113674668 | A | | 11/2021 |
| CN | 214960204 | U | * | 11/2021 |
| JP | 2010109200 | A | | 5/2010 |
| WO | 2012008198 | A1 | | 1/2012 |

OTHER PUBLICATIONS

Written Opinion of the International Search Authority in International application No. PCT/CN2021/140117,dated Aug. 29, 2022.

Chinese Office Action issued in corresponding Chinese Patent Application No. 202111539825.7 dated Jul. 13, 2022, pp. 1-11.

* cited by examiner

BACKLIGHT MODULE, DISPLAY PANEL AND DISPLAY CONTROL METHOD THEREOF, AND DISPLAY DEVICE

CROSS-REFERENCE TO RELATED APPLICATIONS

This application is a 371 U.S. National Phase of International Application No. PCT/CN2021/140117, filed Dec. 21, 2021, which claims priority to Chinese Patent Application No. 202111539825.7, filed Dec. 15, 2021. The entire disclosures of the above applications are incorporated herein by reference.

TECHNICAL FIELD

The present disclosure relates to the display technology field, and more particularly to a backlight module, a display panel and a display control method thereof, and a display device.

BACKGROUND ART

An LCD (Liquid Crystal Display) usually includes a liquid crystal display panel. A backlight module is an important part of the liquid crystal display panel. The liquid crystal display panel further includes a gate driving circuit and thin film transistors. The turn-on of a thin film transistor can be determined by a signal of the gate driving circuit. For example, a gate voltage which turns off the thin film transistor can be provided by a low voltage level in the gate driving circuit.

The backlight module includes a backlight source. A thin film transistor is aged after being irradiated by light from the backlight source for a long time. This results in a leakage current and image retention, which affects display effect and a service life of the display device. An existing solution to the above-mentioned problems is usually to provide a low voltage level signal generation circuit on a back plate. The low voltage level signal generation circuit is a photoresistor circuit. A photoresistor detects a change in light intensity of the backlight module to adjust a resistance value of the photoresistor, thereby generating a required low voltage level signal. The low voltage level signal is introduced into the thin film transistor to tightly turn off a gate of the thin film transistor to prevent a leakage current. However, since the resistance value of the photoresistor does not change linearly with the light intensity, a phenomenon that the above-mentioned low voltage level signal generated by the low voltage level signal generation circuit does not meet a required gate voltage of turning off the thin film transistor easily occurs. Accordingly, effect of turning off the thin film transistor is affected.

Technical Problem

In the prior art, the phenomenon that a low voltage level signal generated by a low voltage level signal generation circuit does not meet a required gate voltage of turning off a thin film transistor easily occurs. Accordingly, effect of turning off the thin film transistor is affected.

Technical Solution

Embodiments of the present disclosure provide a backlight module, a display panel and a display control method thereof, and a display device for solving the problem that in the prior art, effect of turning off the thin film transistor is affected because the phenomenon that a low voltage level signal generated by a low voltage level signal generation circuit does not meet a required gate voltage of turning off a thin film transistor easily occurs.

In a first aspect, an embodiment of the present disclosure provides a backlight module. The backlight module includes a back plate, a light source assembly, and a printed circuit board disposed on the back plate. The printed circuit board includes a low voltage level signal generation circuit. The low voltage level signal generation circuit includes:

a signal input terminal;

a signal output terminal;

a detection sub-circuit, wherein one end of the detection sub-circuit is connected to the signal input terminal, the detection sub-circuit includes at least one photoresistor, the photoresistor can obtain a light signal from the light source assembly to change a resistance value, and the detection sub-circuit can generate a first signal; and a generation sub-circuit, wherein one end of the generation sub-circuit is connected to the other end of the detection sub-circuit, the other end of the generation sub-circuit is connected to the signal output terminal, and the generation sub-circuit is configured to obtain the first signal and process the first signal to obtain a low voltage level signal.

Optionally, the generation sub-circuit includes:

a driving chip, wherein one end of the driving chip is connected to the other end of the detection sub-circuit, the other end of the driving chip is connected to the signal output terminal, and the driving chip outputs the low voltage level signal according to the first signal.

The driving chip of the display panel is multiplexed. An extra circuit structure is not required. Cost can be saved, and effect of a nonlinear change of the photoresistor on the low voltage level signal can also be decreased.

Optionally, the generation sub-circuit further includes:

a memory chip, wherein the memory chip is communicatively connected to the driving chip, the memory chip stores a memory mapping table and outputs a voltage value corresponding to the first signal and obtained according to the memory mapping table to the driving chip for the driving chip to output the low voltage level signal according to the voltage value.

The memory chip of the display panel is multiplexed. An extra circuit structure is not required. Cost can be saved, and component utilization can also be increased.

Optionally, the detection sub-circuit includes:

a first photoresistor, wherein one end of the first photoresistor is connected to the signal input terminal, and the other end of the first photoresistor is connected to the driving chip; and a second photoresistor, wherein one end of the second photoresistor is connected to the other end of the first photoresistor, and the other end of the second photoresistor is grounded.

Compared with one photoresistor, the two photoresistors can adjust a resistance value corresponding to received light and perform a voltage dividing operation or a current limiting operation on the low voltage level signal to avoid that a large current affects the generation circuit.

Optionally, the first photoresistor and the second photoresistor are both arranged at one side of the printed circuit board close to the back plate, and an area of the back plate corresponding to first photoresistor and the second photoresistor is a hollow area, so that the first photoresistor and the second photoresistor can obtain the light signal from the light source assembly.

The two photoresistors are arranged in the hollow area of the back plate. Accordingly, the two photoresistors can receive the light signal conveniently. This is convenient for a subsequent adjustment of the low voltage level signal.

In a second aspect, an embodiment of the present disclosure further provides a display panel including:

a backlight module described in any one of the above-mentioned embodiments;

a thin film transistor; and a driving circuit connected to connected to the low voltage level signal generation circuit in the backlight module and the thin film transistor, wherein the driving circuit can obtain the low voltage level signal from the low voltage level signal generation circuit and transmit the same to the thin film transistor for the low voltage level signal to turn off the thin film transistor.

The generation sub-circuit is disposed in the low voltage level signal generation circuit in the backlight module instead of directly connecting the detection sub-circuit with the driving circuit. This can avoid effect of a nonlinear change of the photoresistor on the low voltage level signal. Accuracy of the generated low voltage level signal can be increased, effect of turning off a gate of the thin film transistor can be more superior, and effect of avoiding a leakage current can be better.

In a third aspect, an embodiment of the present disclosure further provides a display control method of a display panel. The display panel includes a backlight module, a thin film transistor, and a driving circuit. The thin film transistor is connected to the backlight module through the driving circuit. The backlight module includes a light source assembly and a low voltage level signal generation circuit. The low voltage level signal generation circuit includes a detection sub-circuit and a generation sub-circuit which are electrically connected with each other. The display control method includes:

obtaining a light signal of the light source assembly and generating a first signal by the detection sub-circuit;

obtaining the first signal generated by the detection sub-circuit and processing the same to obtain a low voltage level signal by the generation sub-circuit;

obtaining the low voltage level signal generated by the low voltage level signal generation circuit in the backlight module by the driving circuit;

transmitting the low voltage level signal to the thin film transistor by the driving circuit; and obtaining the low voltage level signal by the thin film transistor, and turning off the thin film transistor.

The low voltage level signal obtained by the thin film transistor is provided by the generation sub-circuit instead of being provided by the detection sub-circuit. The generation sub-circuit can process a change of a resistance value of the photoresistor of the detection sub-circuit to output the corresponding low voltage level signal. This can avoid effect of the change of the resistance value of the photoresistor on the low voltage level signal. Accuracy of the generated low voltage level signal can be increased, effect of turning off a gate of the thin film transistor can be more superior, and effect of avoiding a leakage current can be better.

Optionally, the generation sub-circuit includes a driving chip, and the driving chip is electrically connected to the detection sub-circuit.

The obtaining the first signal generated by the detection sub-circuit and the processing the same to obtain the low voltage level signal by the generation sub-circuit include:

outputting the low voltage level signal according to the first signal by the driving chip.

The driving chip of the display panel is multiplexed. An extra circuit structure is not required. Cost can be saved, and effect of a nonlinear change of the photoresistor on the low voltage level signal can also be decreased.

Optionally, the generation sub-circuit further includes a memory chip, and the memory chip is communicatively connected to the driving chip.

The outputting the low voltage level signal according to the first signal by the driving chip includes:

outputting, by the memory chip, a voltage value corresponding to the first signal and obtained according to a memory mapping table to the driving chip for the driving chip to output the low voltage level signal according to the voltage value.

The memory chip of the display panel is multiplexed. An extra circuit structure is not required. Cost can be saved, and component utilization can also be increased.

In a fourth aspect, an embodiment of the present disclosure further provides a display device including the above-mentioned display panel.

In the display device, the low voltage level signal for the thin film transistor is provided more accurately and is not affect by a nonlinear change of the photoresistor. Accordingly, effect of tightly turning off the thin film transistor is better, image retention of the display device can be avoided, and display effect is improved.

Advantageous Effects

In the backlight module, the display panel and the display control method thereof, and display device in the embodiments of the present disclosure, the detection sub-circuit can sense a change of a light source intensity of the light source assembly, and then the low voltage level signal is outputted to the thin film transistor after the first signal is processed by the generation sub-circuit. An amplitude of the low voltage level signal is not adjusted by directly using a change of the photoresistor. As such, accuracy of the thin film transistor can be increased because the low voltage level signal obtained by the thin film transistor is not affected by the nonlinear change of the photoresistor. Effect of turning off the thin film transistor is better, and effect of preventing the leakage current is better.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following descriptions show only some embodiments of the present disclosure, and those skilled in the art may still derive other drawings from these accompanying drawings without creative efforts.

To more completely understand the present disclosure and beneficial effects thereof, it will be described by referring to appended drawings. The same numeral in the appended drawings represents the same part.

DETAILED DESCRIPTION OF EMBODIMENTS

The following clearly describes the technical solutions in the embodiments of the present disclosure with reference to the accompanying drawings in the embodiments of the present disclosure. The described embodiments are some rather than all of the embodiments of the present disclosure. All other embodiments obtained by those skilled in the art based on the embodiments of the present disclosure without creative efforts shall fall within the protection scope of the present disclosure.

In order to solve the problem that effect of turning off a thin film transistor is affected because a phenomenon that a low voltage level signal generated by a low voltage level signal generation circuit does not meet a required gate voltage of turning off the thin film transistor easily occurs, embodiments of the present disclosure provide a backlight module, a display panel, and a display device which are described below in conjunction with the drawings.

Figure 1:
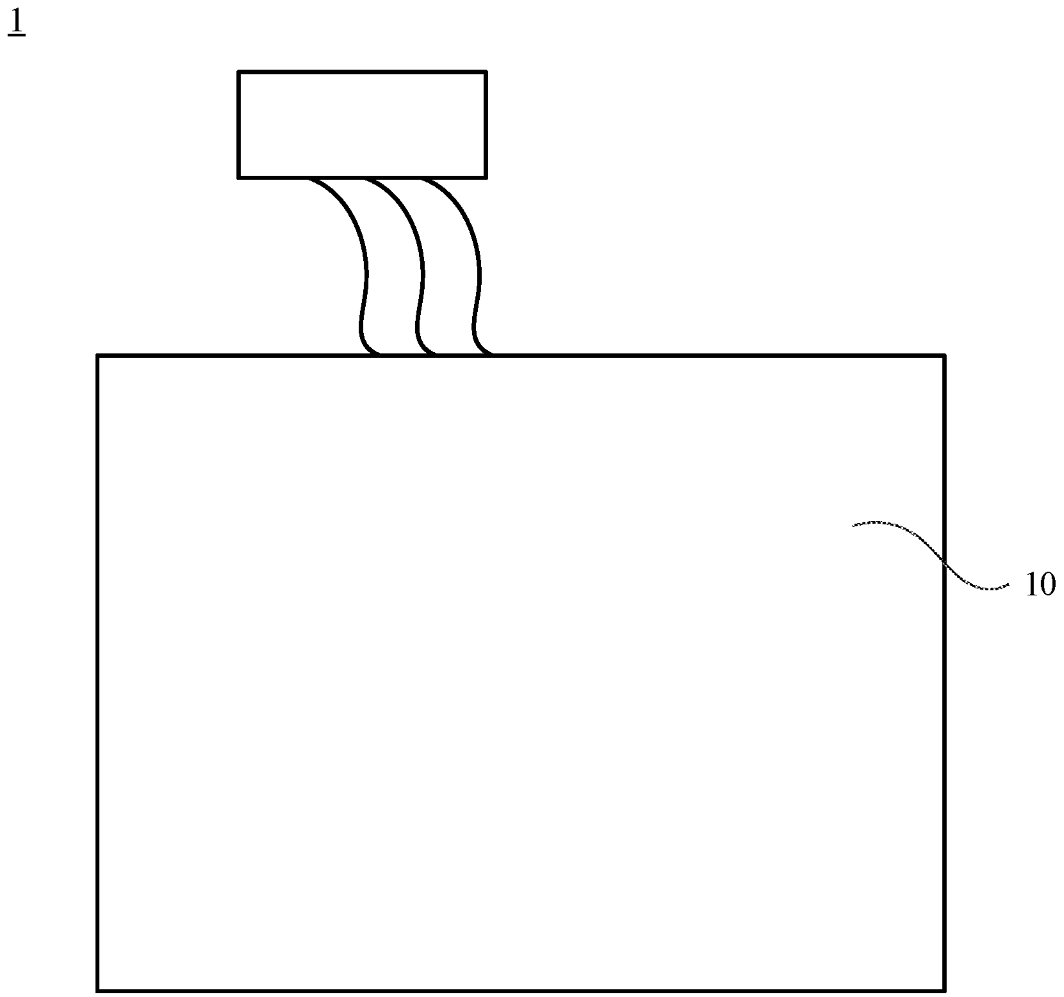
FIG. 1 illustrates a schematic structure diagram of a display device provided by an embodiment of the present disclosure.

Exemplarily, please refer to FIG. 1. FIG. 1 illustrates a schematic structure diagram of a display device provided by an embodiment of the present disclosure. The embodiment of the present disclosure provides a display device 1. The display device 1 can be a liquid crystal display device. The liquid crystal display device is an active matrix liquid crystal display driven by thin film transistors and mainly uses currents to stimulate liquid crystal molecules to produce points, lines, and surfaces to form, in cooperation with a back lamp, an image. IPS (In-Plane Switching) displays, TFT (Thin Film Transistor) displays, and SLCDs (Splice Liquid Crystal Displays) are all subcategories of LCDs. A working principle of a liquid crystal display device is that under action of an electric field, arrangement directions of liquid crystal molecules are changed to change a light transmittance of an external light source (modulation) to complete an electrical-light conversion. Then, different excitations of three primary color signals of R, G, and B are used for passing red, green, and blue filter films to complete color reproduction in a time domain and a space domain. Exemplarily, the display device 1 can be a mobile electronic device, such as a mobile phone, a tablet or the like. The display device 1 can also be a device capable of displaying an image, such as a computer device, a television, a vehicle-mounted computer or the like.

The display device 1 can include a display panel 10 and a program control board. The program control board can control the display panel 10 to display an image according to a preset program. In order to more clearly describe structure components and a working principle of the display panel 10 in the embodiment of the present disclosure, the display panel 10 is described as follows.

Figure 2:
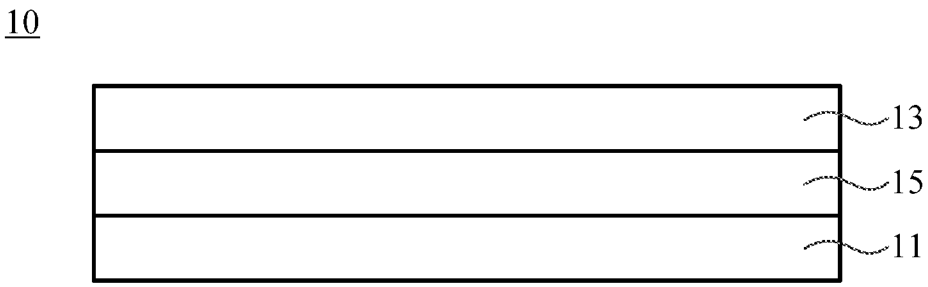
FIG. 2 illustrates a schematic cross-sectional structure diagram of the display panel along a A-A direction in the display device in FIG. 1.

Exemplarily, please refer to FIG. 1 in conjunction with FIG. 2. FIG. 2 illustrates a schematic cross-sectional structure diagram of the display panel along a A-A direction in the display device in FIG. 1. The display panel 10 can include a backlight module 11, a thin film transistor 13, and a driving circuit 15. Exemplarily, the display panel 10 can be a liquid crystal display panel. A liquid crystal pixel of the liquid crystal display panel can be driven by the thin film transistor 13. The backlight module 11 is configured to provide a backlight source to the liquid crystal pixel. The driving circuit 15 is configured to provide a driving signal of whether turning on the thin film transistor 13 and a turn-on time signal of the thin film transistor 13. For the thin film transistor 13, when a gate voltage is within a turn-on voltage range, the thin film transistor 13 is turned on. When the gate voltage is within a turn-off range, the thin film transistor 13 is turned off. A low voltage level signal in the driving circuit 15 can be provided for the thin film transistor 13 to control the thin film transistor 13 to be turned off. It should be noted that the thin film transistor 13 is aging due to long-term exposure to the backlight source in the backlight module 11. This causes that the low voltage level signal fails to turn off the thin film transistor 13 in real time, and thus a leakage current is generated. The leakage current causes image retention of the display device 1, thereby affecting display effect of the display device 1.

Figure 3:
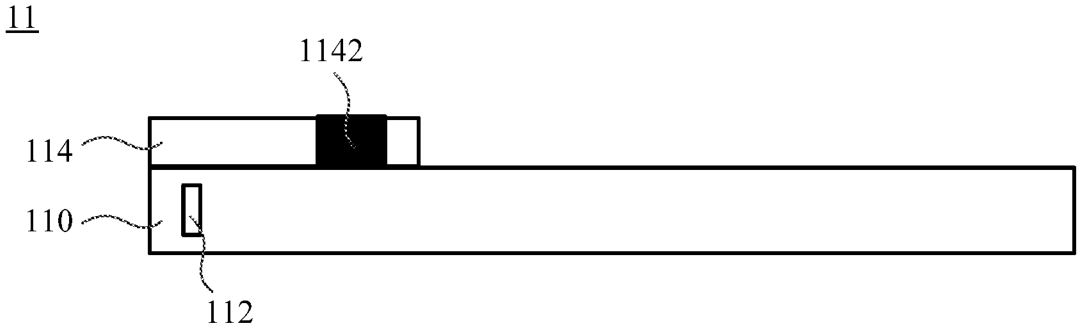
FIG. 3 illustrates a schematic structure diagram of the backlight module in the display panel in FIG. 2.

In order to solve the above-mentioned problems, the embodiment of the present disclosure improves the backlight module 11. Exemplarily, please refer to FIG. 3 in conjunction with FIG. 1 and FIG. 2. FIG. 3 illustrates a schematic structure diagram of the backlight module in the display panel in FIG. 2. The backlight module 11 can include a back plate 110, a light source assembly 112, and a printed circuit board 114 disposed on the back plate 110. With respect to a display surface of the display panel 10, the back plate 110 is disposed on one side away from the display surface of the display panel 10. The back plate 110 is usually used as a supporting structure to support the light source assembly 112 and the printed circuit board 114. The light source assembly 112 can include a plurality of light emitting elements. For example, the light emitting elements can be light emitting diodes (LEDs) or cold cathode fluorescent lamps (CCFLs). The light source assembly 112 is configured to provide a backlight source for the display panel 10. The printed circuit board 114 can be configured to integrate various circuit structures to cooperate with the light source assembly 112 and liquid crystal pixels to realize the display of the display panel 10.

Exemplarily, the printed circuit board 114 can include a low voltage level signal generation circuit 1142. The low voltage level signal generation circuit 1142 is configured to generate a low voltage level signal according to intensity of a light signal emitted by the light source assembly 112. The low voltage level signal is introduced to the thin film transistor 13. A gate of the thin film transistor 13 can be controlled to be turned-off tightly according to the intensity of the light signal emitted by the light source assembly 112, so as to avoid that the thin film transistor 13 is aged and the resulting leakage current problem.

Figure 4:
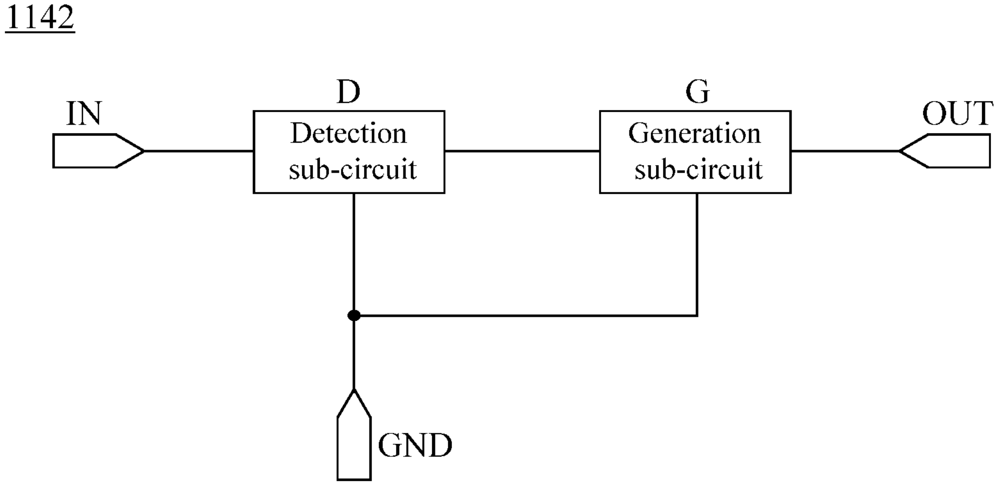
FIG. 4 illustrates a first schematic structure diagram of the low voltage level signal generation circuit in the backlight module in FIG. 3.

Exemplarily, please refer to FIG. 4 in conjunction with FIG. 1 to FIG. 3. FIG. 4 illustrates a first schematic structure diagram of the low voltage level signal generation circuit in the backlight module in FIG. 3. The low voltage level signal generation circuit 1142 includes: a signal input terminal IN, a signal output terminal OUT, a detection sub-circuit D, and a generation sub-circuit G. One end of the detection sub-circuit D is connected to the signal input terminal IN. The detection sub-circuit D includes at least one photoresistor. The photoresistor can obtain the light signal from the light source assembly 112. The detection sub-circuit D can generate a first signal. One end of the generation sub-circuit G is connected to the other end of the detection sub-circuit D, and the other end of the generation sub-circuit G is connected to the signal output terminal OUT. The generation sub-circuit G is configured to obtain the first signal and process the first signal to obtain a low voltage level signal. The detection sub-circuit D can sense a change of a light source intensity of the light source assembly 112, and then the low voltage level signal is outputted to the thin film transistor 13 after the first signal is processed by the generation sub-circuit G. An amplitude of the low voltage level signal is not adjusted by directly using a change of the photoresistor. As such, accuracy of the thin film transistor 13 can be increased because the low voltage level signal obtained by the thin film transistor 13 is not affected by the nonlinear change of the photoresistor. Effect of turning off the thin film transistor 13 is better, and effect of preventing the leakage current is better.

Exemplarily, the signal input terminal IN can be a port for providing the low voltage level signal generation circuit 1142 with, for example, a power signal. For example, an input signal can be a square wave signal. A rectifier sub-circuit can also be provided between the signal input terminal IN and the detection sub-circuit D. That is, the signal input from the signal input terminal IN is rectified or filtered to reduce interference or fluctuation on the low voltage level signal generation circuit 1142 due to the irregular signal. The rectifier sub-circuit is not limited herein. The signal output terminal OUT is configured to output the low voltage level signal to the thin film transistor 13. For example, the signal output terminal OUT can be electrically connected to the driving circuit 15 to transmit the low voltage level signal from the signal output terminal OUT to the thin film transistor 13.

The detection sub-circuit D is configured to detect or sense the change of the light source intensity of the light source assembly 112. For example, the photoresistor in the detection sub-circuit D can receive and collect the light emitted by the light source assembly 112, convert a change of different brightness into a change of a resistance value, and then adjust the amplitude of the low voltage level signal at the signal output terminal OUT to turn off the gate of the thin film transistor 13, thereby preventing the thin film transistor 13 from generating the leaking current.

Figure 5:
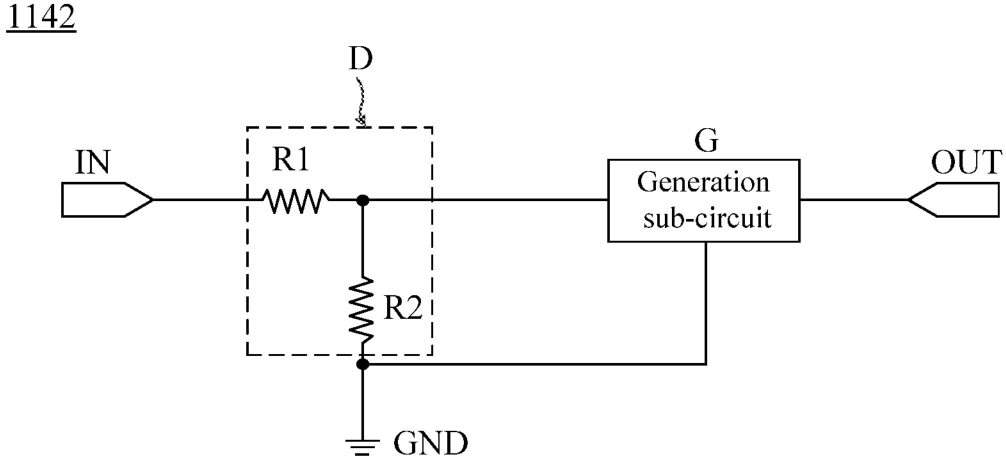
FIG. 5 illustrates a second schematic diagram of the low voltage level signal generation circuit in the backlight module in FIG. 3.
Figure 6:
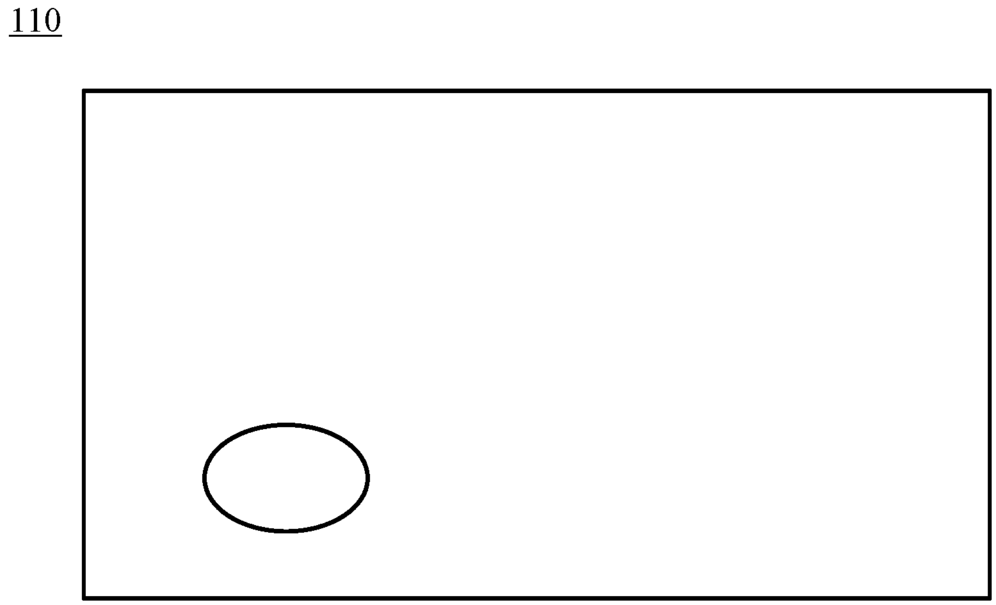
FIG. 6 illustrates a schematic structure diagram of the back plate in the backlight module in FIG. 3.

Exemplarily, please refer to FIG. 5 and FIG. 6 in conjunction with FIG. 1 to FIG. 4. FIG. 5 illustrates a second schematic diagram of the low voltage level signal generation circuit in the backlight module in FIG. 3. FIG. 6 illustrates a schematic structure diagram of the back plate in the backlight module in FIG. 3. The detection sub-circuit D can include a first photoresistor R1 and a second photoresistor R2. One end of the first photoresistor R1 is connected to the signal input terminal IN. One end of the second photoresistor R2 is connected to the other end of the first photoresistor R1, and the other end of the second photoresistor R2 is grounded. The first photoresistor R1 and the second photoresistor R2 are arranged in series and can function as a voltage divider.

In order to enable the first photoresistor R1 and the second photoresistor R2 to obtain the light signal from the light source assembly 112, the setting of the first photoresistor R1 and the second photoresistor R2 can be referred to the following descriptions. Exemplarily, the first photoresistor R1 and the second photoresistor R2 can both be arranged at one side of the printed circuit board 114 close to the back plate 110, and an orthographic projection on the back plate 110 is a hollow area, so that the first photoresistor R1 and the second photoresistor R2 can obtain the light signal from the light source assembly 112.

The generation sub-circuit G is configured to process the first signal generated by the detection sub-circuit D to generate the low voltage level signal to supply the thin film transistor 13. It should be noted that if the change of the photoresistor generated by the detection sub-circuit D is directly transmitted to the thin film transistor 13, it is difficult for the resistor R1 and the second photosensitive resistor R2 to generate a required low voltage level signal because a resistance value of a photoresistor does not change linearly with a change of a light intensity. Moreover, the low voltage level signal delays due to a change in impedance. Therefore, it is difficult to obtain a low voltage level signal which meets requirements. The generation sub-circuit G in the embodiment of the present disclosure can avoid the problem that the low voltage level signal does not meet the requirements due to the nonlinear change of the photoresistor. The generation sub-circuit G can process the resistance value of the photoresistor before outputting the low voltage level signal which meet the requirements. Accordingly, the influence caused by the nonlinear change of the photoresistor can be avoided.

Figure 7:
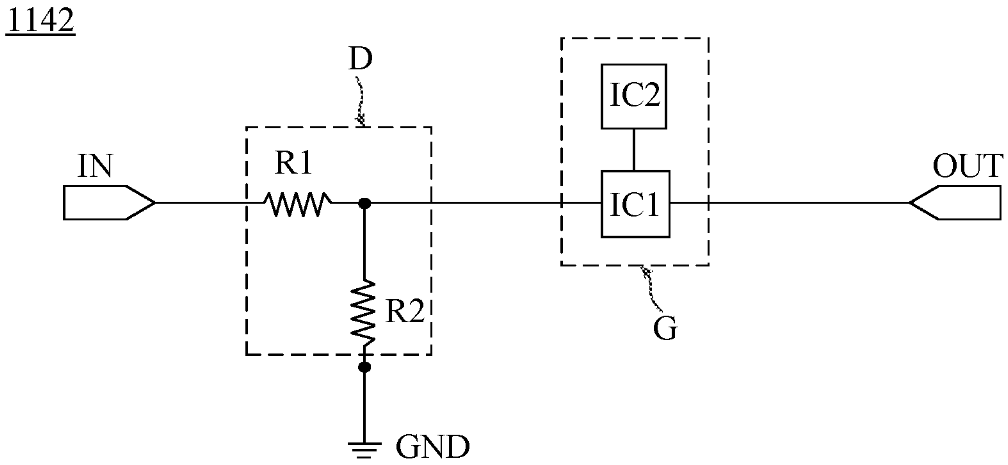
FIG. 7 illustrates a third schematic diagram of the low voltage level signal generation circuit in the backlight module in FIG. 3.

Exemplarily, please refer to FIG. 7 in conjunction with FIG. 1 to FIG. 6. FIG. 7 illustrates a third schematic diagram of the low voltage level signal generation circuit in the backlight module in FIG. 3. The generation sub-circuit G can include a driving chip IC1. One end of the driving chip IC1 is connected to the other end of the detection sub-circuit D. For example, the one end of the driving chip IC1 can be connected to the other end of the first photoresistor R1. The other end of the driving chip IC1 is connected to the signal output terminal OUT to output the signal processed by the driving chip IC1 to the signal output terminal OUT.

Exemplarily, the generation sub-circuit G can further include a memory chip IC2. The memory chip IC2 is communicatively connected to the driving chip IC1. For example, the memory chip IC2 is connected to the driving chip IC1 through respective pins. The memory chip IC2 can store the first signal and a memory mapping table. A voltage value corresponding to the first signal can be obtained through the memory mapping table. The storage mapping table can also be one or more formulas. The storage mapping table is configured to store the voltage value corresponding to the first signal, so that a voltage value can be generated corresponding to each first signal. The driving chip IC1 can obtain a voltage value in the storage mapping table and output a corresponding low voltage level signal.

Exemplarily, the driving chip IC1 can be a TCON board. A logic board is also called as a screen driving board, a central control board, or a TCON board. A function of the logic board is to convert, after a logic process, an LVDS image data input signal (the input signal includes RGB data signals, clock signals, and control signals) transmitted from a digital board into an LVDS signal which can drive the LCD screen. The LVDS signal is directly transmitted to an LVDS receiver chip of the LCD screen. The image data signal is stored by a processing shift register. The clock signal is converted into a control signal which the screen can recognize. Row and column signals RSDS controls the operations of the MOSFETs tube in the screen to control the twist of the liquid crystal molecules and drive the LCD screen to display an image. The memory chip IC2 can be a FLASH (flash memory), which can store part of data.

It should be noted that in the embodiment of the present disclosure, the change of the light intensity is detected by the photoresistor of the detection sub-circuit D, and the driving chip IC 1 records it in the memory chip IC2. When the drive chip IC1 detects the change of the recorded voltage, the low voltage level signal is changed accordingly, so as to tightly turn off the gate of the thin film transistor 13 to prevent the leakage current. Such the low voltage level signal generation circuit 1142 requires fewer components, and cost can be saved. Moreover, the adjusted low voltage level signal in the embodiment of the present disclosure is actively modified by the driving chip IC1 instead of being generated by the printed circuit board 114, thereby avoiding the delay of the low voltage level signal caused by a change in impedance. In a third aspect, the function of the detection sub-circuit D in the embodiment of the present disclosure is to detect the change of the light intensity instead of directly adjusting the amplitude of the low voltage level signal. Accordingly, whether a curve of a change of a resistance value of the photoresistor is linear does not affect the accuracy of the generated low voltage level signal, and the low voltage level signal adjusted by the low voltage level signal generation circuit 1142 in the embodiment of the present disclosure is more accurate.

It should be noted that the driving circuit 15 is connected to the low voltage level signal generation circuit 1142 in the backlight module 11 and the thin film transistor 13. The driving circuit 15 can obtain the low voltage level signal from the low voltage level signal generation circuit 1142 and transmit the same to the thin film transistor 13, so that the low voltage level signal turns off the gate of the thin film transistor 13 tightly to prevent the leakage current.

In order to more clearly describe a functioning mode of the backlight module 11 in the embodiment of the present disclosure, an embodiment of the present disclosure further provides a display control method of a display panel, which will be described below with reference to the accompanying drawings.

Figure 8:
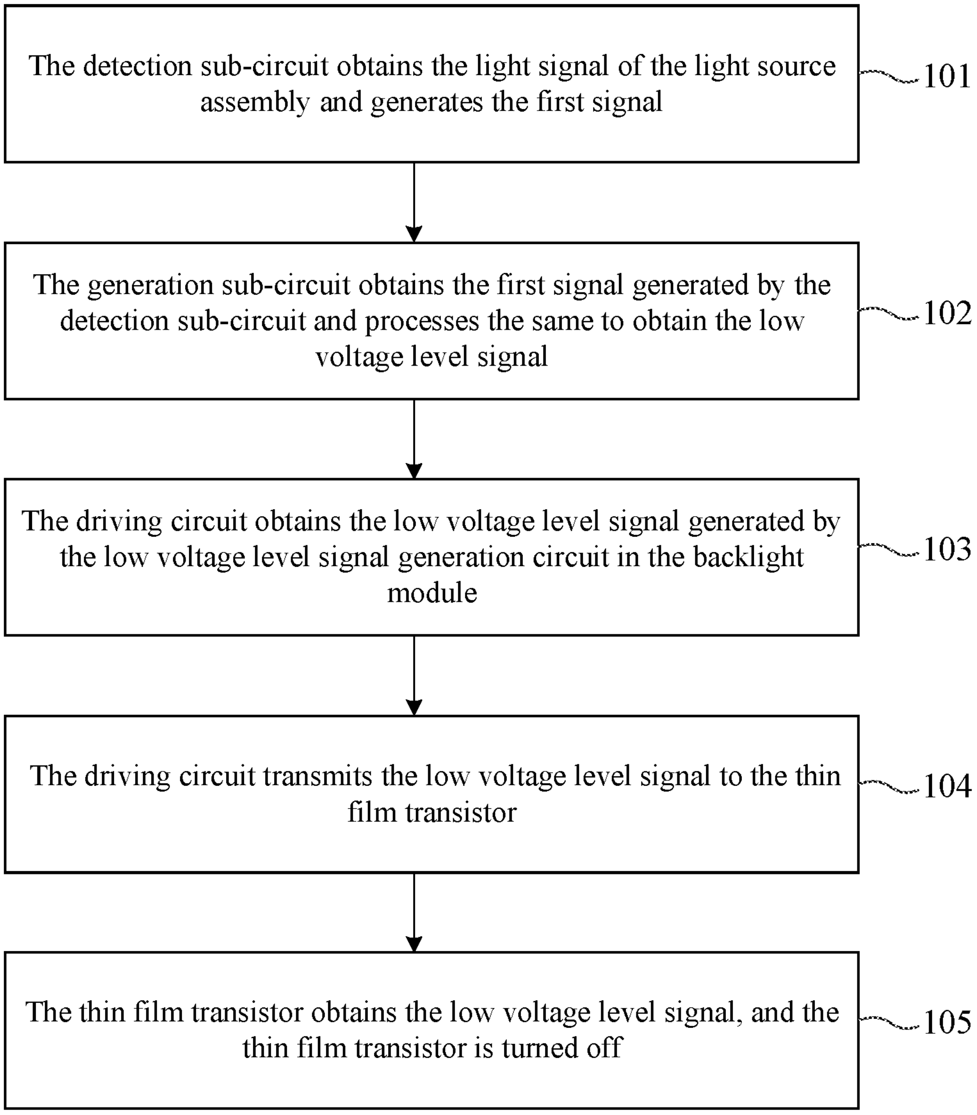
FIG. 8 illustrates a flowchart of a display control method of a display panel provided by an embodiment of the present disclosure.

Exemplarily, please refer to FIG. 8 in conjunction with FIG. 1 to FIG. 7. FIG. 8 illustrates a flowchart of a display control method of a display panel provided by an embodiment of the present disclosure. The structure and components of the display panel 10 can be referred to the above-mentioned descriptions and FIG. 1 to FIG. and are not repeated herein. The display control method includes the following steps.

In 101, the detection sub-circuit obtains the light signal of the light source assembly and generates the first signal.

In 102, the generation sub-circuit obtains the first signal generated by the detection sub-circuit and processes the same to obtain the low voltage level signal.

In steps 101 and 102, the detection sub-circuit D obtains the light signal of the light source assembly 112 through the photoresistor. The components of the detection sub-circuit D can be referred to the above-mentioned descriptions. That is, sampling can be performed by a change of a resistance value of the photoresistor. Then, the first signal is generated, and the first signal is transmitted to the generation sub-circuit G for processing.

The generation sub-circuit G can include the driving chip IC1. One end of the driving chip IC1 is connected to the other end of the detection sub-circuit D. For example, the one end of the driving chip IC1 can be connected to the other end of the first photoresistor R1. The other end of the driver chip IC1 is connected to the signal output terminal OUT to output the signal processed by the driving chip IC1 to the signal output terminal OUT.

Exemplarily, the generation sub-circuit G can further include a memory chip IC2. The memory chip IC2 is communicatively connected to the driving chip IC1. For example, the memory chip IC2 is connected to the driving chip IC1 through respective pins. The memory chip IC2 can store the first signal and the memory mapping table. The voltage value corresponding to the first signal can be obtained through the memory mapping table. The storage mapping table can also be one or more formulas. The storage mapping table is configured to store the voltage value corresponding to the first signal, so that a voltage value can be generated corresponding to each first signal. The driving chip IC1 can obtain a voltage value in the storage mapping table and output a corresponding low voltage level signal.

In 103, the driving circuit obtains the low voltage level signal generated by the low voltage level signal generation circuit in the backlight module.

The driving circuit 15 is configured to provide the driving signal of whether turning on the thin film transistor 13 and the turn-on time signal of the thin film transistor 13. For the thin film transistor 13, when the gate voltage is within the turn-on voltage range, the thin film transistor 13 is turned on. When the gate voltage is within the turn-off range, the thin film transistor 13 is turned off. The low voltage level signal in the driving circuit 15 can be provided for the thin film transistor 13 to control the thin film transistor 13 to be turned off.

Two ends of the driving circuit 15 are respectively connected to the thin film transistor 13 and the low voltage level signal generation circuit 1142 in the backlight module 11. The low voltage level signal generated by the low voltage level signal generation circuit 1142 can be transmitted to or provided for the thin film transistor 13 by the driving circuit 15.

The step of obtaining, by the driving circuit 15, the low voltage level signal generated by the low voltage level signal generation circuit 1142 in the backlight module 11 can include: obtaining the first signal generated by the detection sub-circuit D; and processing the first signal to obtain the low voltage level signal. The detection sub-circuit D can detect the change of the light intensity of the light source assembly 112 through the photoresistor R to generate the first signal. The generation sub-circuit G can process the first signal to obtain the low voltage level signal.

In 104, the driving circuit transmits the low voltage level signal to the thin film transistor.

In 105, the thin film transistor obtains the low voltage level signal, and the thin film transistor is turned off.

In steps 104 and 105, it should be noted that the thin film transistor 13 is aging due to long-term exposure to the backlight source in the backlight module 11. This causes that the low voltage level signal thin film transistor 13 fails to turn off the thin film transistor 13 in time, and thus the leakage current is generated. The leakage current causes image retention of the display device 1, thereby affecting display effect of the display device 1.

In the embodiment of the present disclosure, the driving circuit 15 is connected to the low voltage level signal generation circuit 1142 in the backlight module 11 and the thin film transistor 13. The driving circuit 15 can obtain the low voltage level signal from the low voltage level signal generation circuit 1142 and transmit the same to the thin film transistor 13, so that the low voltage level signal turns off the gate of the thin film transistor 13 tightly to prevent the leakage current.

In the embodiment of the present disclosure, the change of the light intensity is detected by the photoresistor of the detection sub-circuit D, and the driving chip IC 1 records it in the memory chip IC2. When the drive chip IC1 detects the change of the recorded voltage, the low voltage level signal is changed accordingly, so as to tightly turn off the gate of the thin film transistor 13 to prevent the leakage current. Such the low voltage level signal generation circuit 1142 requires fewer components, and cost can be saved. Moreover, the adjusted low voltage level signal in the embodiment of the present disclosure is actively modified by the driving chip IC1 instead of being generated by the printed circuit board 114, thereby avoiding the delay of the low voltage level signal caused by a change in impedance. In a third aspect, the function of the detection sub-circuit D in the embodiment of the present disclosure is to detect the change of the light intensity instead of directly adjusting the amplitude of the low voltage level signal. Accordingly, whether a curve of a change of a resistance value of the photoresistor is linear does not affect the accuracy of the generated low voltage level signal, and the low voltage level signal adjusted by the low voltage level signal generation circuit 1142 in the embodiment of the present disclosure is more accurate.

In the above-mentioned embodiments, descriptions for the embodiments emphasize different aspects, and for a part without being described in detail in a certain embodiment, reference may be made to related descriptions in other embodiments.

In the descriptions of the present disclosure, the terms "first" and "second" are merely intended for a purpose of description, and shall not be understood as an indication or implication of relative importance or implicit indication of the number of indicated technical features. Therefore, a feature limited by "first" or "second" may explicitly or implicitly include at least one of the features.

The backlight module, the display panel and display control method thereof, and the display device provided by the embodiments of the present disclosure are described in detail above. Although the principles and implementations of the present disclosure are described by using specific examples in this specification, the above-mentioned descriptions of the embodiments are only intended to help understand the method and the core idea of the method of the present disclosure. Moreover, those skilled in the art can make modifications to the specific implementations and an application range according to the idea of the present disclosure. In conclusion, the content of the specification is not intended to be construed as a limitation on the present disclosure.

What is claimed is:

1. A backlight module, wherein the backlight module comprises a back plate, a light source assembly, and a printed circuit board disposed on the back plate, the printed circuit board comprises a low voltage level signal generation circuit, the low voltage level signal generation circuit comprises:

a signal input terminal;

a signal output terminal;

a detection sub-circuit, wherein one end of the detection sub-circuit is connected to the signal input terminal, the detection sub-circuit comprises at least one photoresistor, the photoresistor can obtain a light signal from the light source assembly to change a resistance value, and the detection sub-circuit can generate a first signal; and a generation sub-circuit, wherein one end of the generation sub-circuit is connected to the other end of the detection sub-circuit, the other end of the generation sub-circuit is connected to the signal output terminal, and the generation sub-circuit is configured to obtain the first signal and process the first signal to obtain a low voltage level signal, wherein the generation sub-circuit comprises:

a driving chip, wherein one end of the driving chip is connected to the other end of the detection sub-circuit, the other end of the driving chip is connected to the signal output terminal, and the driving chip outputs the low voltage level signal according to the first signal; and a memory chip, communicatively connected to the driving chip, and storing a memory mapping table and outputs a voltage value corresponding to the first signal and obtained according to the memory mapping table to the driving chip for the driving chip to output the low voltage level signal according to the voltage value.

2. The backlight module of claim 1, wherein the detection sub-circuit comprises:

a first photoresistor, wherein one end of the first photoresistor is connected to the signal input terminal, and the other end of the first photoresistor is connected to the driving chip; and a second photoresistor, wherein one end of the second photoresistor is connected to the other end of the first photoresistor, and the other end of the second photoresistor is grounded.

3. The backlight module of claim 2, wherein the first photoresistor and the second photoresistor are both arranged at one side of the printed circuit board close to the back plate, and an area of the back plate corresponding to first photoresistor and the second photoresistor is a hollow area, so that the first photoresistor and the second photoresistor can obtain the light signal from the light source assembly.

4. A display panel, comprising:

a backlight module comprising a back plate, a light source assembly, and a printed circuit board disposed on the back plate, wherein the printed circuit board comprises a low voltage level signal generation circuit, and the low voltage level signal generation circuit comprises:

a signal input terminal;

a signal output terminal;

a detection sub-circuit, wherein one end of the detection sub-circuit is connected to the signal input terminal, the detection sub-circuit comprises at least one photoresistor, the photoresistor can obtain a light signal from the light source assembly to change a resistance value, and the detection sub-circuit can generate a first signal; and a generation sub-circuit, wherein one end of the generation sub-circuit is connected to the other end of the detection sub-circuit, and the other end of the generation sub-circuit is connected to the signal output terminal, and the generation sub-circuit is configured to obtain the first signal and process the first signal to obtain a low voltage level signal;

a thin film transistor; and a driving circuit connected to the low voltage level signal generation circuit in the backlight module and the thin film transistor, wherein the driving circuit can obtain the low voltage level signal from the low voltage level signal generation circuit and transmit the low voltage level signal to the thin film transistor for the low voltage level signal to turn off the thin film transistor, wherein the generation sub-circuit comprises:

a driving chip, wherein one end of the driving chip is connected to the other end of the detection sub-circuit, the other end of the driving chip is connected to the signal output terminal, and the driving chip outputs the low voltage level signal according to the first signal; and a memory chip, communicatively connected to the driving chip, and storing a memory mapping table and outputs a voltage value corresponding to the first signal and obtained according to the memory mapping table to the driving chip for the driving chip to output the low voltage level signal according to the voltage value.

5. The display panel of claim 4, wherein the detection sub-circuit comprises:

a first photoresistor, wherein one end of the first photoresistor is connected to the signal input terminal, and the other end of the first photoresistor is connected to the driving chip; and a second photoresistor, wherein one end of the second photoresistor is connected to the other end of the first photoresistor, and the other end of the second photoresistor is grounded.

6. The display panel of claim 5, wherein the first photoresistor and the second photoresistor are both arranged at one side of the printed circuit board close to the back plate.

7. The display panel of claim 6, wherein an area of the back plate corresponding to first photoresistor and the second photoresistor is a hollow area, so that the first photoresistor and the second photoresistor can obtain the light signal from the light source assembly.

8. A display device, comprising a display panel, the display panel comprising:

a backlight module comprising a back plate, a light source assembly, and a printed circuit board disposed on the back plate, wherein the printed circuit board comprises a low voltage level signal generation circuit, and the low voltage level signal generation circuit comprises:

a signal input terminal;

a signal output terminal;

a detection sub-circuit, wherein one end of the detection sub-circuit is connected to the signal input terminal, the detection sub-circuit comprises at least one photoresistor, the photoresistor can obtain a light signal from the light source assembly to change a resistance value, and the detection sub-circuit can generate a first signal; and a generation sub-circuit, wherein one end of the generation sub-circuit is connected to the other end of the detection sub-circuit, the other end of the generation sub-circuit is connected to the signal output terminal, and the generation sub-circuit is configured to obtain the first signal and process the first signal to obtain a low voltage level signal;

a thin film transistor; and a driving circuit connected to the low voltage level signal generation circuit in the backlight module and the thin film transistor, wherein the driving circuit can obtain the low voltage level signal from the low voltage level signal generation circuit and transmit the low voltage level signal to the thin film transistor for the low voltage level signal to turn off the thin film transistor, wherein the generation sub-circuit comprises:

a driving chip, wherein one end of the driving chip is connected to the other end of the detection sub-circuit, the other end of the driving chip is connected to the signal output terminal, and the driving chip outputs the low voltage level signal according to the first signal; and a memory chip, communicatively connected to the driving chip, and storing a memory mapping table and outputs a voltage value corresponding to the first signal and obtained according to the memory mapping table to the driving chip for the driving chip to output the low voltage level signal according to the voltage value.

9. The display device of claim 8, wherein the detection sub-circuit comprises:

a first photoresistor, wherein one end of the first photoresistor is connected to the signal input terminal, and the other end of the first photoresistor is connected to the driving chip; and a second photoresistor, wherein one end of the second photoresistor is connected to the other end of the first photoresistor, and the other end of the second photoresistor is grounded.

10. The display device of claim 9, wherein the first photoresistor and the second photoresistor are both arranged at one side of the printed circuit board close to the back plate.

11. The display device of claim 10, wherein an area of the back plate corresponding to first photoresistor and the second photoresistor is a hollow area, so that the first photoresistor and the second photoresistor can obtain the light signal from the light source assembly.

* * * * *